(12) United States Patent
Axelson et al.

(10) Patent No.: US 11,304,398 B2
(45) Date of Patent: Apr. 19, 2022

(54) CONTROL SYSTEM, METHOD AND COMPUTER PROGRAM FOR A MILKING MACHINE

(71) Applicant: DELAVAL HOLDING AB, Tumba (SE)

(72) Inventors: Johan Axelson, Tumba (SE); Bengt Engman, Tumba (SE); Håkan Etell, Tumba (SE); Hans Hansson, Tumba (SE)

(73) Assignee: DeLaval Holding AB, Tumba (SE)

( * ) Notice: Subject to any disclaimer, the term of this patent is extended or adjusted under 35 U.S.C. 154(b) by 99 days.

(21) Appl. No.: 16/651,304

(22) PCT Filed: Sep. 24, 2018

(86) PCT No.: PCT/SE2018/050969
§ 371 (c)(1),
(2) Date: Mar. 26, 2020

(87) PCT Pub. No.: WO2019/066700
PCT Pub. Date: Apr. 4, 2019

(65) Prior Publication Data
US 2020/0267925 A1    Aug. 27, 2020

(30) Foreign Application Priority Data
Sep. 26, 2017    (SE) .................... 1751190-8

(51) Int. Cl.
*A01J 5/007* (2006.01)
*A01J 5/017* (2006.01)
(Continued)

(52) U.S. Cl.
CPC ............. *A01J 5/007* (2013.01); *A01J 5/0175* (2013.01); *G05B 19/04* (2013.01); *A01J 5/0133* (2013.01);
(Continued)

(58) Field of Classification Search
None
See application file for complete search history.

(56) References Cited

U.S. PATENT DOCUMENTS 6,584,931 B1    7/2003    Käll et al.
6,864,914 B1    3/2005    Birk
(Continued)

FOREIGN PATENT DOCUMENTS

CN    103136827 A    6/2013
CN    104808623 A    7/2015
(Continued)

OTHER PUBLICATIONS

SE Search Report, dated DATE, from corresponding SE application No. 1751190-8.
(Continued)

*Primary Examiner* — Carlos R Ortiz Rodriguez
(74) *Attorney, Agent, or Firm* — Nixon & Vanderhye

(57) ABSTRACT

An automatic milking machine controlled by a control unit that, in response to a control request from a first remote user terminal that indicates an intention to initiate transmission of control commands and/or parameter settings, checks whether at least one control command and/or parameter setting from a second remote user terminal has been received within a particular interval preceding a point in time when the control request was received, and if so, returns status data to the first remote user terminal that indicate an identity of the second remote user terminal so that, based thereon, an operator of the first remote user terminal can decide whether or not to remote control the milking machine at the present point in time.

20 Claims, 2 Drawing Sheets

(51) Int. Cl.
*G05B 19/04* (2006.01)
*A01J 5/013* (2006.01)
*A01J 7/04* (2006.01)
*A01K 1/12* (2006.01)
*A01K 29/00* (2006.01)

(52) U.S. Cl.
CPC . *A01J 7/04* (2013.01); *A01K 1/12* (2013.01); *A01K 29/005* (2013.01)

(56) References Cited

U.S. PATENT DOCUMENTS

| | | |
|---|---|---|
| 7,017,515 B1 | 3/2006 | Ruda |
| 2002/0045970 A1 | 4/2002 | Krause et al. |
| 2006/0243211 A1 | 11/2006 | Eriksson et al. |
| 2009/0165725 A1 | 7/2009 | Kaever et al. |
| 2017/0068411 A1 | 3/2017 | Matsushima |

FOREIGN PATENT DOCUMENTS

| | | |
|---|---|---|
| WO | 99/30277 A1 | 6/1999 |
| WO | 01/15518 A1 | 3/2001 |
| WO | 2005/000009 A1 | 1/2005 |
| WO | 2018/044159 A1 | 3/2018 |

OTHER PUBLICATIONS

International Search Report and Written Opinion, dated Dec. 20, 2018, from corresponding PCT application No. PCT/SE2018/050969.
Office Action issued in Chinese Patent Application No. 201880057292.9 dated Aug. 27, 2021.

CONTROL SYSTEM, METHOD AND COMPUTER PROGRAM FOR A MILKING MACHINE

TECHNICAL FIELD

The present invention relates generally to control of milking machines. More particularly the invention relates to a control system according to the preamble of claim 1 and a corresponding method. The invention also relates to a computer program and a non-volatile data carrier.

BACKGROUND

Today, there are milk extraction systems with remote-control interfaces. This enhances the overall efficiency and provides the farmer with a flexible means of interaction with various pieces of milking equipment.

WO 2005/000009 describes one example of a method and a system for remote supervision of an automatic milking system by use of a computer means. Web-documents are here obtained from the computer means which web-documents contain information about a milking station and/or animals. A connection is established between the automatic milking system and a communication unit. Web documents are then created and transmitted to the communication unit.

Such remote-control operation of an automatic milking machine and its auxiliary components may be highly beneficial. However, since the remote control enables many users independent access to the milking machine, conflict situations may arise as to who controls the milking machine at a given point in time. This may jeopardize the milk quality. It may also endanger the animal well-being.

SUMMARY

The object of the present invention is therefore to mitigate the above problems and offer a more predictable and reliable system for controlling an automatic milking machine.

According to one aspect of the invention, the object is achieved by the initially described system, wherein the control unit is configured to receive a control request from a first remote user terminal via the communication interface. The control request indicates an intention to initiate transmission of control commands and/or parameter settings from the first remote user terminal for controlling the automatic milking machine. In response to the control request, the control unit is configured to check if at least one control command and/or parameter setting from a second remote user terminal has been received in the communication interface within a particular interval preceding a point in time when the control request was received. If so, the control unit is configured to send status data to the first remote user terminal via the communication interface. The status data indicate an identity of the second remote user terminal.

The above-mentioned control request may be represented by a first control command (or set of such commands) per se, from the first remote user terminal. Alternatively, the control request may be a setup command (e.g. a connection from a client software in the first remote user terminal to a server software in the control unit).

The proposed control system is advantageous because it notifies a new remote-control operator about the existence of any previous remote-control operator before the new remote-control operator starts to control the automatic milking machine. Hence, the new remote-control operator may actively choose to either interfere with an ongoing remote control session, or wait until a later point in time.

According to one embodiment of this aspect of the invention, the status data further indicate at least one action performed by the automatic milking machine in response to said at least one control command and/or parameter setting from the second remote user terminal. Consequently, the new remote-control operator also becomes informed about which working phase that might be influenced by any control commands and/or parameter settings issued by the first remote user terminal.

Preferably, the status data are generated if and only if the at least one control command and/or parameter setting from the second remote user terminal has been received in the communication interface within the particular interval. In other words, if the separation in time between the control commands and/or parameter settings issued by the first and second remote user terminals respectively is longer than the particular interval, the first remote user terminal will not be notified even if the actions resulting from the second remote user terminal's control commands and/or parameter settings have not yet been completed.

According to another embodiment of this aspect of the invention, if: (a) no control command or parameter setting has been received in the communication interface from any other remote user terminal within the particular interval, and (b) no action is currently being performed by the automatic milking machine in response to any control commands or parameter settings from any other remote user terminal, the control unit is likewise configured to send status data to the first remote user terminal via the communication interface. Here, the status data indicate that the automatic milking machine is ready to receive control commands and/or parameter settings in a conflict-free manner. Thereby, the new remote-control operator can make sure that he/she does not disturb any ongoing remote control of the automatic milking machine.

According to yet another embodiment of this aspect of the invention, the control unit is configured to, after having received the control request from the first remote user terminal: (i) check if at least one control command and/or parameter setting is received from the first remote user terminal; and if so (ii) control the automatic milking machine to operate in response to the at least one control command and/or parameter setting from the first remote user terminal. Hence, an operator of the first remote user terminal can effect various actions in the automatic milking machine.

According to a further embodiment of this aspect of the invention, the control unit is configured to handle the at least one control command and/or parameter setting from the first remote user terminal with precedence over any previously received control commands and/or parameter settings. This means that any yet uncompleted action that is being performed by the automatic milking machine in response to the previously received control commands and/or parameter settings is aborted in response to receiving the at least one control command and/or parameter setting. Instead, the control unit controls the automatic milking machine to operate in response to the at least one control command and/or parameter setting from the first remote user terminal. In other words, a later remote control session can always override an earlier initiated remote control session.

According to another embodiment of this aspect of the invention, the local user interface includes at least one of a visual indicator and/or an acoustic indicator. Further, the control unit is configured to cause the at least one visual/acoustic indicator to reflect whether the automatic milking machine is set to operate based on operator-generated instructions received via the a local user interface, or in accordance with control commands and/or parameter settings received via the communication interface. Thereby, any operator located near the automatic milking machine can be readily informed about any remote control in progress. Naturally, this is advantageous from a safety point-of-view.

According to another aspect of the invention, the object is achieved by a method of controlling an automatic milking machine. The method is implemented in a control unit associated with the automatic milking machine, and the method involves causing the automatic milking machine to operate in accordance with control commands and/or parameter settings, and receiving the control commands and/or parameter settings from a local user interface fixedly arranged at the automatic milking machine, or from a remote user terminal in communicative connection with the control unit through a network and a communication interface. The method further involves receiving a control request from a first remote user terminal via the communication interface. The control request indicates an intention to initiate transmission of control commands and/or parameter settings from the first remote user terminal for controlling the automatic milking machine. In response to the control request, the method involves checking if at least one control command and/or parameter setting from a second remote user terminal has been received in the communication interface within a particular interval preceding a point in time when the control request was received. If so, the method further involves sending status data to the first remote user terminal via the communication interface. The status data indicate an identity of the second remote user terminal. The advantages of this method, as well as the preferred embodiments thereof, are apparent from the discussion above with reference to the proposed control system.

According to a further aspect of the invention the object is achieved by a computer program loadable into a non-volatile data carrier communicatively connected to a processing unit. The computer program includes software for executing the above method when the program is run on the processing unit.

According to another aspect of the invention the object is achieved by a non-volatile data carrier containing the above computer program.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DETAILED DESCRIPTION

Figure 1:
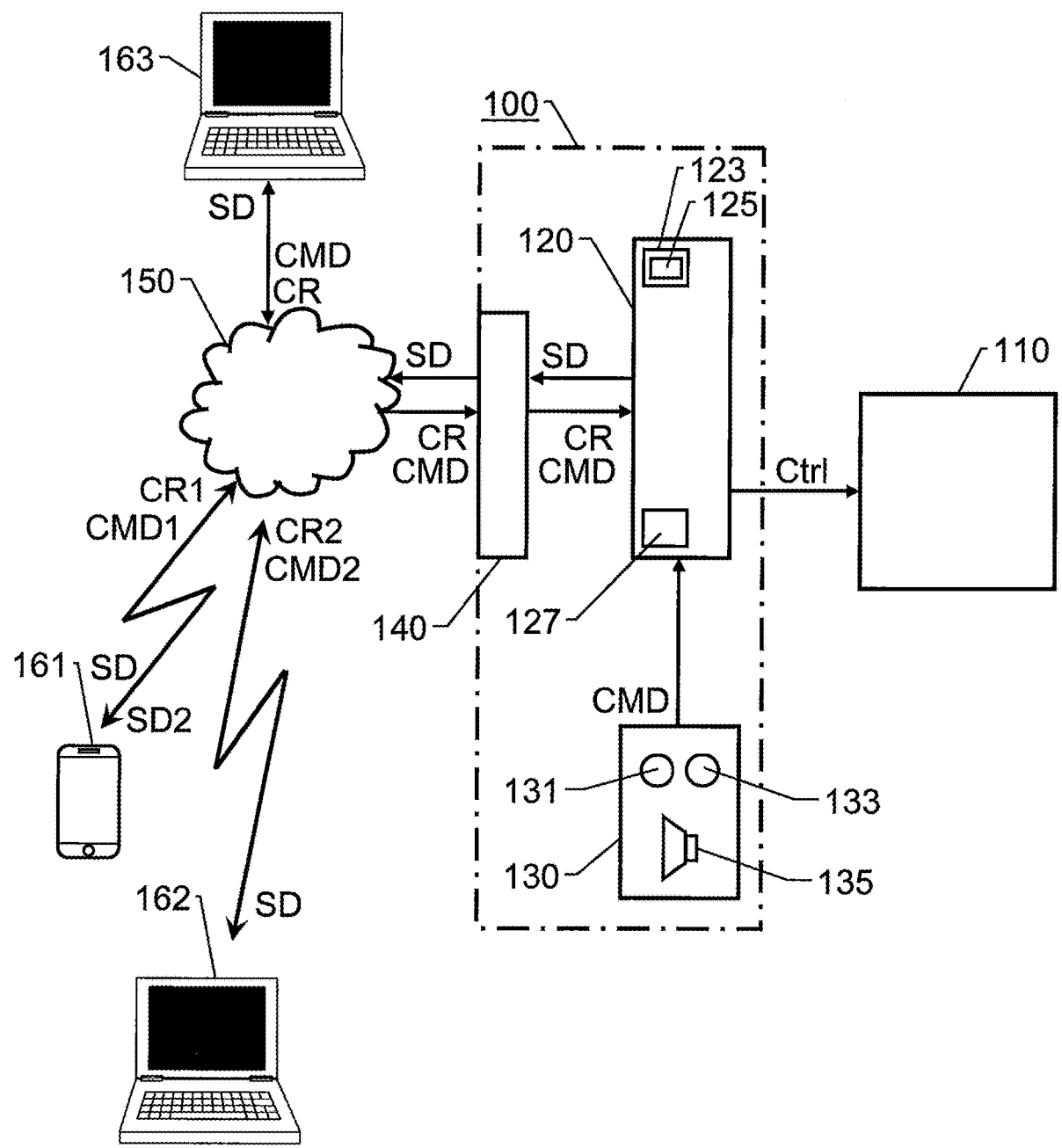
FIG. 1 shows a system according to one embodiment of the invention.

FIG. 1 shows an example of a system 100 according to one embodiment of the invention. Here, a control unit 120 is configured to control an automatic milking machine 110 to operate in a certain manner via a control signal Ctrl. The control signal Ctrl, in turn, is generated in accordance with control commands and/or parameter settings CMD that are received in the control unit 120 either via a local user interface 130 or through a communication interface 140.

The local user interface 130 is fixedly arranged at the automatic milking machine 110 and is configured to receive operator-generated instructions, and in response thereto produce the control commands and/or parameter settings CMD to the control unit 120. The communication interface 140 is configured to receive the control commands and/or parameter settings CMD from a remote terminal, which for example may be represented by a wireless user terminal 161, e.g. in the form of a smartphone, a phablet or a tablet computer; a portable computer 162, e.g. in the form of a laptop or any other kind of computer 163. The remote terminals 161, 162 and/or 163 are communicatively connected to the communication interface 140 via at least one network 150. Depending on the type of connection used, the at least one network 150 may also include one or more wireless access networks. In other words, if the remote terminal has a wireless interface to the communication interface 140, the at least one network 150 includes a wireless access network adapted to said wireless interface.

The control unit 120 is also configured to receive control requests CR from the remote terminals 161, 162 and/or 163 via the communication interface 140. The control requests CR are issued prior to the control commands and/or parameter settings CMD and the control requests CR indicate an intention to initiate transmission of control commands and/or parameter settings CMD from a particular remote user terminal for controlling the automatic milking machine 110. Here, let us assume that a first remote terminal 161 has sent a control request CR1 to the control unit 120 via the at least one network 150 and the communication interface 140.

Figure 2:
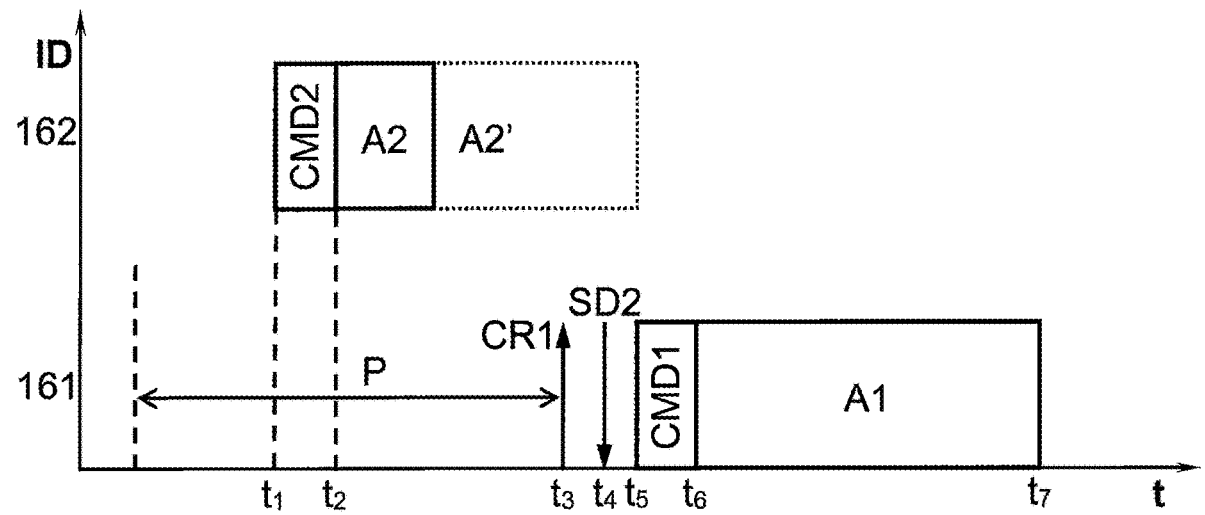
FIG. 2 presents a diagram exemplifying how control commands and/or parameter settings are handled according to one embodiment of the invention.

Referring now also to FIG. 2, we see a diagram exemplifying how control commands and/or parameter settings are handled according to one embodiment of the invention.

In response to the control request CR1, the control unit 120 is configured to check if at least one control command and/or parameter setting CMD2 from another remote user terminal, say 162, has been received in the communication interface 140 within a particular interval P preceding a point in time $t_3$ when the control request CR1 was received.

In the example of FIG. 2, the at least one control command and/or parameter setting CMD2 from the remote user terminal 162 was first received in the communication interface 140 at a point in time $t_1$; and at a later point in time $t_2$, the reception thereof was completed. Subsequently, the control unit 120 controls the automatic milking machine 110 to perform at least one action A2 in response to said at least one control command and/or parameter setting CMD2 from the remote user terminal 162. Here, we assume that the at least one action A2 is completed before the point in time $t_3$; however the difference in time between $t_1$ and $t_3$ is less than the particular interval P. Therefore, the control unit 120 sends status data SD2 to the first remote user terminal 161 via the communication interface 140 at a point in time $t_4$. The status data SD2 indicate an identity ID of the remote user terminal 162. Consequently, the operator with the first remote user terminal 161 becomes informed about the fact that the remote user terminal 162 has sent at least one control command and/or parameter setting CMD2 relatively recently. Hence, it cannot be excluded that the at least one resulting action A2 has not yet been completed.

Preferably, the control unit 120 is configured to generate the status data SD2 if and only if the at least one control command and/or parameter setting CMD2 from the second remote user terminal 162 has been received in the communication interface 140 within the particular interval P. I.e. if the difference in time between $t_1$ and $t_3$ exceeds the particular interval P, no status data SD2 will be generated by the control unit 120.

According to one embodiment of the invention, the status data SD2 further indicate the at least one action A2 performed by the automatic milking machine 110 in response to the at least one control command and/or parameter setting CMD2 from the remote user terminal 162. This may be useful, since the type of action being performed is relevant information when determining whether or not it is appropriate to abort the action prematurely. For example, if needed, a milking action can be terminated at an earlier point in time than originally planned without severe implications. However, a cleaning action should preferably be entirely completed. Otherwise, cleaning fluids that must be rinsed out not to contaminate the milk may unintentionally remain in the conduits of the automatic milking machine 110.

Moreover, after having received the control request CR1 from the first remote user terminal 161, the control unit 120 is preferably configured to check if at least one control command and/or parameter setting CMD1 is received from the first remote user terminal 161. If so, the control unit 120 is configured to control Ctrl the automatic milking machine 110 to operate in response to the at least one control command and/or parameter setting CMD1 from the first remote user terminal 161.

In the present example, we assume that the operator with the first the remote terminal 161 decides to send control commands and/or parameter settings CMD1 at a point in time $t_5$ shortly after $t_4$. As a result, at yet a somewhat later point in time $t_6$, at least one action A1 is performed by the automatic milking machine 110 in response to the at least one control command and/or parameter setting CMD1 from the first remote user terminal 161. The at least one action A1 is completed at yet later a point in time $t_7$.

According to one embodiment of the invention, the control unit 120 is configured to handle the at least one control command and/or parameter setting CMD1 from the first remote user terminal 161 with precedence over any previously received control commands and/or parameter settings CMD2. This means that irrespective of whether or not an action A2' being performed by the automatic milking machine 110 in response to the previously received control commands and/or parameter settings CMD2 has been completed, the control unit 120 will control the milking machine 110 to instead start performing actions in response to the at least one control command and/or parameter setting CMD1 from the first remote user terminal 161. In other words, any yet uncompleted action A2' being performed by the automatic milking machine 110 in response to the previously received control commands and/or parameter settings CMD2 is aborted in response to receiving the at least one control command and/or parameter setting CMD1.

If no control command or parameter setting CMD has been received in the communication interface 140 from any other remote user terminal within the particular interval P, and no action is currently being performed by the automatic milking machine 110 in response to any prior control commands or parameter settings CMD from any other remote user terminal, the control unit 120 is preferably configured to send status data SD to the first remote user terminal 161 via the communication interface 140. Here, the status data SD indicate that the automatic milking machine 110 is ready to receive control commands and/or parameter settings CMD1 in a conflict-free manner. Consequently, an operator with the first remote user terminal 161 is assured that the automatic milking machine 110 can be remote controlled without interfering with other users' remote control instructions.

To enable the remote control of the automatic milking machine 110 from the remote terminals 161, 162 and 163, a dedicated software, e.g. in the form of a software/app, may be installed in the remote terminals 161, 162 and 163 respectively.

Of course, according to the invention, the local user interface 130 may be implemented in many different ways. A touchscreen GUI (graphical user interface) is one example, and a button box is another example. A display with associated keys or buttons is yet another example of how the local user interface 130 can be implemented.

Preferably, the local user interface 130 contains at least one visual indicator 131 and/or 133 respectively. The control unit 120 is here configured to cause the at least one visual indicator 131 and/or 133 to reflect whether the automatic milking machine 110 is set to operate based on operator-generated instructions received via the a local user interface 130, or in accordance with control commands and/or parameter settings CMD received via the communication interface 140. This may involve causing the at least one visual indicator 131 and/or 133 to flash in a first pattern if the automatic milking machine 110 set to operate based on operator-generated instructions received via the a local user interface 130 (e.g. be lit up during a relatively short interval, and then be dark during a relatively long interval, and so on), and flash in a second pattern if the automatic milking machine 110 set to operate in accordance with control commands and/or parameter settings CMD received via the communication interface 140 (e.g. be lit up during a relatively long interval, and then be dark during a relatively short interval, and so on).

Naturally, in addition to, or as an alternative thereto, one or more further visual indicators may be included in the local user interface 130 to reflect additional and/or alternative operation modes.

In further addition thereto and/or as yet an alternative, the local user interface 130 may include an acoustic indicator 135 (e.g. a beeper, buzzer or a loudspeaker) to reflect additional operation modes for the milking machine 110 and/or to indicate the control source in an alternative way.

Naturally, at least one input member of the local user interface 130 may contain at least one of the at least one visual indicator 131 and/or 133, for example in the form of a light source integrated into a button or key on a control panel.

It is generally advantageous if the control unit 120 is configured to effect the above-described procedure in an automatic manner, for instance by executing a computer program 125. Therefore, the control unit 120 may be communicatively connected to a memory unit, i.e. non-volatile data carrier 123, storing the computer program 125, which, in turn, contains software for making at least one processor in the control unit 120 execute the above-described actions when the computer program 125 is run in the control unit 120.

Figure 3:
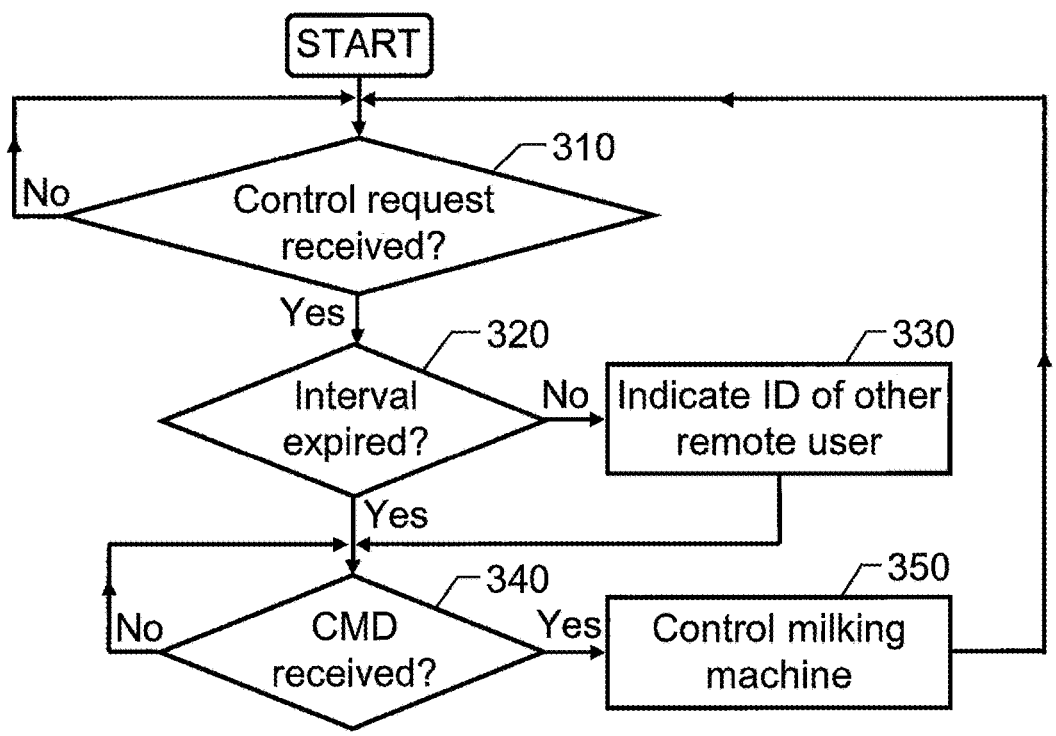
FIG. 3 illustrates, by means of a flow diagram, a method according to one embodiment of the invention for controlling a milking machine.

In order to sum up, and with reference to the flow diagram in FIG. 3, we will now describe the method according to one embodiment of the invention for controlling the automatic milking machine 110 remotely via the control unit 120.

In a first step 310, it is checked if a control request has been received. The control request indicates an intention to initiate transmission of control commands and/or parameter settings from a particular remote user terminal for controlling the automatic milking machine. If no control request has been received, the procedure loops back and stays in step 310. Otherwise, i.e. if a control request has been received, e.g. from a first remote user terminal, a step 320 follows.

In step 320, it is checked if particular interval has expired since any previous control commands and/or parameter settings were received; or in other words, if at least one control command and/or parameter setting from another remote user terminal has been received in the communication interface within the particular interval preceding a point in time when the control request in step 310 was received. If the question in step 320 is answered in the positive, a step 340 follows; otherwise, the procedure continues to a step 330.

In step 330, status data are sent to the first remote user terminal via the communication interface, which status data indicate an identity of said other remote user terminal, i.e. the one from which the previously received control commands and/or parameter settings originate.

In step 340, it is checked if at least one control command and/or parameter setting has been received from the first remote user terminal; and if so, step 350 follows. Otherwise, the procedure loops back and stays in step 340.

In step 350, the automatic milking machine is controlled to operate in response to the at least one control command and/or parameter setting from the first remote user terminal. Thereafter, the procedure loops back to step 310.

All of the process steps, as well as any sub-sequence of steps, described with reference to FIG. 3 may be controlled by means of a programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A system (100) for controlling an automatic milking machine (110), the system (100) comprising:
   a control unit (120) configured to operate the automatic milking machine (110);
   a local user interface (130) configured to receive operator-generated instructions, and in response thereto produce and transmit control commands and/or parameter settings to the control unit (120), the local user interface (130) being fixedly arranged at the automatic milking machine (110); and
   a communication interface (140) configured to, via a network (150), receive control commands and/or parameter settings,
   wherein the control unit (120) is further configured to:
      receive, via the communication interface (140), a control request (CR1) from a first remote user terminal (161), the control request (CR1) indicating an intention to initiate transmission of control commands and/or parameter settings from the first remote user terminal (161) for controlling the automatic milking machine (110), and
      in response to a reception of the control request (CR1), check if at least one control command and/or parameter setting from a second remote user terminal (162) has been received in the communication interface (140) within a particular interval (P) preceding a point in time ($t_3$) when the control request (CR1) was received, and if so, send, via the communication interface (140), status data (SD2) to the first remote user terminal (161), where said status data (SD2) indicate an identity (ID) of the second remote user terminal (162).

2. The system (100) according to claim 1, wherein the status data (SD2) further indicate at least one action (A2) performed by the automatic milking machine (110) in response to said at least one control command and/or parameter setting from the second remote user terminal (162).

3. The system (100) according to claim 1, wherein the control unit (120) is configured to generate said status data (SD2) if and only if the at least one control command and/or parameter setting from the second remote user terminal (162) has been received in the communication interface (140) within the particular interval (P).

4. The system (100) according to claim 1, wherein the control unit (120) is further configured such that if:
   no control command or parameter setting has been received in the communication interface (140) from any other remote user terminal (162, 163) within the particular interval (P), and
   no action is currently being performed by the automatic milking machine (110) in response to any control commands or parameter settings from any other remote user terminal (162, 163),
   the control unit (120) sends, via the communication interface (140), readiness status data (SD) to the first remote user terminal (161), where the readiness status data (SD) indicate that the automatic milking machine (110) is ready to receive control commands and/or parameter settings in a conflict-free manner.

5. The system (100) according to claim 1, wherein the control unit (120) is further configured to, after having received the control request (CR1) from the first remote user terminal (161), check if at least one of said control commands and/or parameter settings is received from the first remote user terminal (161), and if so, control (Ctrl) the automatic milking machine (110) to operate in response to the at least one of said control commands and/or parameter settings from the first remote user terminal (161).

6. The system (100) according to claim 5, wherein the control unit (120) is further configured to handle the at least one of said control commands and/or parameter settings from the first remote user terminal (161) with precedence over any previously received control commands and/or parameter settings such that:
   any yet uncompleted action (A2') being performed by the automatic milking machine (110) in response to the previously received control commands and/or parameter settings is aborted in response to receiving the at least one of said control commands and/or parameter settings, and
   the control unit (120) controls (Ctrl) the automatic milking machine (110) to instead operate in response to the at least one of said control commands and/or parameter settings from the first remote user terminal (161).

7. The system (100) according to claim 1,
   wherein the local user interface (130) comprises at least one of a visual indicator (131; 133) and an acoustic indicator (135), and
   wherein the control unit (120) is further configured to cause the at least one visual/acoustic indicator (131; 133, 137) to reflect whether the automatic milking machine (110) is set to operate based on operator-generated instructions received via the a local user interface (130), or in accordance with the control commands and/or parameter settings received via the communication interface (140).

8. A method of controlling (Ctrl) an automatic milking machine (110) implemented in a control unit (120) associated with the automatic milking machine (110), the method comprising:
   receiving control commands and/or parameter settings from either of a local user interface (130) fixedly arranged at the automatic milking machine (110) or a remote user terminal (161, 162, 163) in communicative connection with the control unit (120) through a network (150) and a communication interface (140);
   receiving, via the communication interface (140), a control request (CR1) from a first remote user terminal (161), the control request (CR1) indicating an intention to initiate transmission of control commands and/or parameter settings from the first remote user terminal (161) for controlling the automatic milking machine (110); and
   responsive to a reception of the control request (CR1), checking if at least one control command and/or parameter setting from a second remote user terminal (162) has been received in the communication interface (140) within a particular interval (P) preceding a point in time ($t_3$) when the control request (CR1) was received, and if so, sending, via the communication interface (140), status data (SD2) to the first remote user terminal (161), where said status data (SD2) indicate an identity (ID) of the second remote user terminal (162).

9. The method according to claim 8, wherein the status data (SD2) further indicate at least one action (A2) performed by the automatic milking machine (110) in response to said at least one control command and/or parameter setting from the second remote user terminal (162).

10. The method according to claim 8, further comprising:
    generating said status data (SD2) if and only if the at least one control command and/or parameter setting from the second remote user terminal (162) was received in the communication interface (140) within the particular interval (P).

11. The method according to claim 8, further comprising:
    if no control command or parameter setting has been received in the communication interface (140) from any other remote user terminal (162, 163) within the particular interval (P), and if no action is currently being performed by the automatic milking machine (110) in response to any control commands or parameter settings from any other remote user terminal (162, 163), sending, via the communication interface (140), readiness status data (SD) to the first remote user terminal (161), where the readiness status data (SD) indicate that the automatic milking machine (110) is ready to receive control commands and/or parameter settings in a conflict-free manner.

12. The method (100) according to claim 8, further comprising:
    after the reception of the control request (CR1) from the first remote user terminal (161), checking if at least one of said control commands and/or parameter settings is received from the first remote user terminal (161), and if so, controlling (Ctrl) the automatic milking machine (110) to operate in response to the at least one of said control commands and/or parameter settings from the first remote user terminal (161).

13. The method according to claim 12, wherein the control unit handles the at least one of said control commands and/or parameter settings from the first remote user terminal (161) with precedence over any previously received control commands and/or parameter settings such that:
    any yet uncompleted action (A2') being performed by the automatic milking machine (110) in response to the previously received control commands and/or parameter settings is aborted in response to receiving the at least one of said control commands and/or parameter settings, and
    the automatic milking machine (110) instead is controlled (Ctrl) to operate in response to the at least one of said control commands and/or parameter settings from the first remote user terminal (161).

14. A non-transitory data storage medium having a computer program (125) stored thereon, the computer program executable by a processing unit (127) and the computer program (125) comprising software that, upon execution by the processing unit (127), causes the processing unit (127) to execute the method according to claim 8.

15. The system (100) according to claim 3, wherein the control unit (120) is further configured such that if:
    no control command or parameter setting has been received in the communication interface (140) from any other remote user terminal (162, 163) within the particular interval (P), and
    no action is currently being performed by the automatic milking machine (110) in response to any control commands or parameter settings from any other remote user terminal (162, 163),
    the control unit (120) sends, via the communication interface (140), readiness status data (SD) to the first remote user terminal (161), where the readiness status data (SD) indicate that the automatic milking machine (110) is ready to receive control commands and/or parameter settings in a conflict-free manner.

16. The system (100) according to claim 15, wherein the control unit (120) is further configured to, after having received the control request (CR1) from the first remote user terminal (161), check if at least one of said control commands and/or parameter settings is received from the first remote user terminal (161), and if so, control (Ctrl) the automatic milking machine (110) to operate in response to the at least one of said control commands and/or parameter settings from the first remote user terminal (161).

17. The system (100) according to claim 16, wherein the control unit (120) is further configured to handle the at least one of said control commands and/or parameter settings from the first remote user terminal (161) with precedence over any previously received control commands and/or parameter settings such that:
    any yet uncompleted action (A2') being performed by the automatic milking machine (110) in response to the previously received control commands and/or parameter settings is aborted in response to receiving the at least one of said control commands and/or parameter settings, and
    the control unit (120) controls (Ctrl) the automatic milking machine (110) to instead operate in response to the at least one of said control commands and/or parameter settings from the first remote user terminal (161).

18. The method according to claim 11, further comprising:
    if no control command or parameter setting has been received in the communication interface (140) from any other remote user terminal (162, 163) within the particular interval (P), and if no action is currently being performed by the automatic milking machine (110) in response to any control commands or parameter settings from any other remote user terminal (162, 163), sending, via the communication interface (140), readiness status data (SD) to the first remote user terminal (161), where the readiness status data (SD) indicate that the automatic milking machine (110) is ready to receive control commands and/or parameter settings in a conflict-free manner.

19. The method (100) according to claim 18, further comprising:
    after the reception of the control request (CR1) from the first remote user terminal (161), checking if at least one of said control commands and/or parameter settings is received from the first remote user terminal (161), and if so, controlling (Ctrl) the automatic milking machine (110) to operate in response to the at least one of said control commands and/or parameter settings from the first remote user terminal (161).

20. The method according to claim 19, wherein the control unit handles the at least one of said control commands and/or parameter settings from the first remote user terminal (161) with precedence over any previously received control commands and/or parameter settings such that:
    any yet uncompleted action (A2') being performed by the automatic milking machine (110) in response to the previously received control commands and/or parameter settings is aborted in response to receiving the at least one of said control commands and/or parameter settings, and
    the automatic milking machine (110) instead is controlled (Ctrl) to operate in response to the at least one of said control commands and/or parameter settings from the first remote user terminal (161).

* * * * *